3,712,934
**WEATHERABLE, HIGH IMPACT, THERMO-
PLASTIC RESIN COMPOSITION**
Hiroshi Kiuchi and Yoshio Takezawa, Otsu-shi, Japan, assignors to Toray Industries, Inc., Tokyo, Japan
Filed Dec. 5, 1969, Ser. No. 882,468
Claims priority, application Japan, Dec. 6, 1968, 43/88,974
Int. Cl. C08f 41/12, 29/56, 29/50
U.S. Cl. 260—876 R      6 Claims

ABSTRACT OF THE DISCLOSURE

A thermoplastic resin composition essentially of (I) high impact-resistance resin (A) obtained from graft polymerizing the mixture consisting essentially of (a) 98–40% by weight monomer or monomer mixture containing at least 70% by weight of monomer or monomer mixture selected from the group consisting of vinyl aromatic, methacrylic acid alkyl ester wherein the alkyl group contains 1–3 carbon atoms, and acrylonitrile and less than 30% by weight of other vinyl monomer, wherein, in such monomer or monomer mixture the sum of 3.5 times the percent by weight of acrylonitrile plus the percent by weight of said methacrylic acid alkyl ester is within the range of 25–150% by weight of the monomer or monomer mixture, (b) from 2–60% by weight rubbery graft activated copolymer of ethylene and vinyl acetate, wherein the ethylene content is from 60–95% by weight, and (II) high impact-resistance resin (B) obtained from (c) graft polymerizing the mixture of about more than 4% by weight, preferably less than 70% by weight, polybutadiene series rubber and about less than 96% by weight, preferably more than 30% by weight said monomer or monomer mixture (a), or (d) blending said polybutadiene series rubber with the resin obtained from polymerizing said monomer or monomer mixture (a).

With the thermoplastic resin composition thus obtained, polybutadiene series rubber should be within the range of 2–70% by weight of total rubber content.

GENERAL FIELD OF THE INVENTION

This invention relates to a thermoplastic resin composition having good surface smoothness and excellent weatherability, impact resistance and moldability.

Various rubber-modified high impact resins, such as ABS resin (acrylonitrile-butadiene-styrene) and high impact polystyrene resin, for example, are well known. They have been prepared by using a so-called chain transfer type graft polymerization process. For example, styrene or styrene and acrylonitrile or methyl methacrylate have been polymerized in the presence of a rubbery copolymer of the conjugated diolefin series using a polymerization initiator such as an organic peroxide, for example, having an interface affinity phase separation structure. This type of process has been used for the preparation of ABS resin or high impact polystyrene resin.

DISCUSSION OF THE PRIOR ART

While such resin compositions are excellent in impact resistance, they are very poor in weatherability.

Efforts have been made to determine why the weatherability of this ABS resin is inferior. For example, J. Shimada and K. Kabuki checked the change of the infrared absorption spectrum (see Journal of Applied Polymer Science, vol. 12, pp. 671–682 [1968]). Also, D. J. Boyle and B. D. Gesner checked yellowing and impact resistance due to thermal and photo degradations of transparent ABS resin (see Journal of Applied Polymer Science, vol. 12, pp. 1193–1197 [1968]), reporting that at least at the initial stage of the photo degradation these degradations are due to the photo decomposition or photo oxidation in the rubber components. Hardly any chemical change and change in impact resistance are recognized in the resin component, and this conclusion is applicable not only to ABS resin only, but also to blended compositions containing diene in general.

Further, C. B. Bucknall and D.G. Street carried out basic experiments. These were based on the well known fact that the butadiene rubber reinforced resin becomes brittle throughout a surface layer having a thickness equal to the thickness through which ultra-violet ray can transmit. This confirms the reason for degradation of the physical properties of a butadiene rubber reinforced thermoplastic resin, due to outdoor exposure, further proving that such reasoning is justified (see Journal of Applied Polymer Science, vol. 12, pp. 1311–1320 [1968]).

The fact that the physical properties of such a molded article are degraded only at a very slight part of the surface layer, despite the fact that a greater part of the internal layer is not degraded, is important.

The decreasing ratio of tensile strength due to photo degradation of ABS resin is larger than that of a styrene-acrylonitrile copolymer. Accordingly, the reason therefore is considered to reside either in acceleration of degradation of ABS resin when degraded rubber exists on the surface layer or deterioration of the mechanical properties due to a so-called "surface notch" effect in which the degraded rubber becomes a stress concentration point. As is well known, rubber of the butadiene series tends to undergo degradation due to oxidation; when only a small part of the surface layer degrades, the mechanical properties of the resin as a whole are remarkably degraded. Therefore, improving the weatherability of such resins is considered very difficult.

SUMMARY OF THE INVENTION

It has now been found that by mixing a polybutadiene-containing polymer with a copolymer referred to herein as "resin A," novel and advantageous results are obtained. Resin A may be made by polymerizing a vinyl monomer such as styrene, acrylonitrile and methyl methacrylate in the presence of a graft activated ethylene-vinyl acetate copolymer, namely an elastomeric ethylene-vinyl acetate copolymer into a part of whose side chain a $CH_2=C(CH_3)COO-$ group or a $CH_2=CHCOO-$ group has been introduced.

While acrylonitrile-styrene copolymer resins and acrylic resins have better weatherability properties than ABS resin, nevertheless, even when this acrylonitrile-styrene copolymer resin or acrylic resin is blended with ABS resin, the weatherability of ABS resin hardly improves at all. This is because, as mentioned above, rubber of the butadiene series tends to undergo degradation by oxidation; moreover, when only a small part of the surface layer degrades, the mechanical properties of the resin as a whole deteriorate remarkably. Accordingly, it is considered natural that even when a resin having excellent weatherability is blended with ABS resin, it is difficult to improve the weatherability of ABS resin if rubber of the butadiene series exists at the surface layer.

DETAILED DESCRIPTION OF THE INVENTION

It has now been found that, contrary to expectations based upon the prior art, a resin composition can be obtained by mixing ABS resin with the aforesaid resin (A) which is clearly superior to ABS resin in weatherability. The weatherability of such composition is near that of resin (A) alone, despite the fact that ABS resin is blended therewith, and in some cases the weatherability of such composition is surprisingly superior to that of said resin (A).

Accordingly, this invention relates to a thermoplastic resin composition having excellent impact resistance and weatherability, said composition consisting of (I) resin (A) prepared by polymerizing a mixture consisting of (a) a radical copolymerizable vinyl monomer or monomer mixture having at least about 70% by weight of a compound selected from the group consisting of an aromatic vinyl compound, methacrylic acid alkyl ester (said alkyl group having 1–3 carbon atoms) and acrylonitrile, the total of 3.5 times the percent by weight of acrylonitrile plus the percent by weight of methacrylic acid alkyl ester being within the range of 25–150% by weight of said monomer or monomer mixture, and (b) an ethylene-vinyl acetate copolymer (rubber component) having connected to its side chain a member selected from the group consisting of $CH_2=C(CH_3)COO-$ and $CH_2=CHCOO-$, and (II) ABS resin.

The thermoplastic resin composition consisting of a blend of resin (A) and ABS resin surprisingly has all the excellent qualities of ABS resin and, in addition, its weatherability is far superior to that of ABS resin.

It will be understood from the foregoing discussion of the prior art and the data presented herein with respect to the present invention, and judging from the fact that the presence of rubber of the butadiene series is the primary reason why the weatherability of ABS resin and high impact polystyrene is remarkably inferior, it is a surprising fact that despite the presence of polybutadiene in the thermoplastic resin composition of the present invention, its weatherability is far superior to that of ABS resin.

In the present invention, the vinyl aromatic compound is a compound of the formula

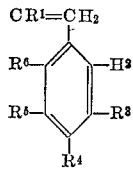

wherein $R^1$, $R^2$, $R^3$, $R^4$, $R^5$ and $R^6$ each represent hydrogen, methyl group or halogen atom. Preferred examples are styrene, α-methyl styrene, p-methyl styrene and halogenated styrene.

Specific examples of the methacrylic acid alkyl ester (the alkyl group has 1–3 carbon atoms) include methyl methacrylate, ethyl methacrylate, n-propyl methacrylate and iso-propyl methacrylate. The monomer mixture used in the preparation of resin (A) or ABS resin may include a methacrylic acid alkyl ester having an alkyl group containing at least four carbon atoms, such as butyl methacrylate, acrylic acid esters such as methyl acrylate and butyl acrylate, methacrylonitrile; also optionally a vinyl aromatic compound or a monomeric vinyl compound which is copolymerizable with methacrylic acid alkyl ester (whose alkyl group has 1–3 carbon atoms), as the occasion demands, provided the amount of such additional vinyl compounds is less than 30% by weight of the total weight of said mixture.

The ethylene-vinyl acetate copolymer in accordance with this invention is a copolymer whose ethylene content is about 60–95% by weight. The vinyl acetate may, however, be replaced by a quantity of vinyl compound other than vinyl acetate, such as vinyl propionate and vinyl benzoate, vinyl alcohol (which is unstable in the free state but is formed by hydrolysis of the vinyl acetate component of the copolymer), acrylic acid, methacrylic acid and alkyl ester of these compounds. However, the amount of substitution should not exceed 90%, preferably 70%, thus leaving at least 10%, preferably 30%, of vinyl acetate present in the copolymer.

The ethylene-vinyl acetate copolymer comprising the rubber component of the present invention whose ethylene content is 60–95% by weight and which has in its side chain a $CH_2=C(CH_3)COO-$ group or a $CH_2=CHCOO-$ is prepared by reacting an ethylene-vinyl acetate copolymer (i) or a copolymer of ethylene with vinyl acetate and other vinyl compound such as vinyl alcohol (ii) obtained by partially hydrolyzing (i) with methacrylic acid or acrylic acid, an acid anhydride, an acid chloride or an alkyl ester thereof. In this case, if necessary, an acid catalyst such as hydrochloric acid, sulfuric acid and paratoluenesulfonic acid or an alkaline catalyst such as methylate or ethylate of an alkali metal such as sodium or potassium is used. For example, in the combination of (ii) with a methacrylic acid alkyl ester, by using sodium methylate as a catalyst it is possible to cause a direct ester interchange reaction to introduce a $CH_2=C(CH_3)COO-$ group into the side chain of (i). Also, in the combination of (ii), with methacrylic acid chloride or acrylic acid chloride, it is possible to introduce a $CH_2=C(CH_3)COO-$ group or $CH_2CHCOO-$ group into the side chain of (ii) without necessarily using a catalyst. Further, in the combination of (ii) with methacrylic acid or acrylic acid, by using paratoluenesulfonic acid as a catalyst, it is possible to cause an ester interchange reaction and introduce a $CH_2=C(CH_3)COO-$ group or a $CH_2=CHCOO-$ group into the side chain of (ii). It is preferable that the amount of $CH_2=C(CH_3)COO-$ group of $CH_2=CHCOO-$ group introduced is about 0.02–1.0 mmole/g., preferably 0.04–0.60 mmole/g. The control of the amounts of these double bonds introduced is carried out by controlling the reaction temperature, the reaction period and the amount of the catalyst used in carrying out the reaction.

The aforesaid resin (A), according to the present invention, is obtained by copolymerizing (a) a radical copolymerizable vinyl monomer or vinyl monomer mixture having such a composition that the total of one or two species of vinyl aromatic compound, methacrylic acid alkyl ester (the alkyl group contains 1–3 carbon atoms) and acrylonitrile comprises at least about 70% by weight and the total of 3.5 times the percentage by weight of acrylonitrile plus the percentage by weight of methacrylic acid alkyl ester (the alkyl ester contains 1–3 carbon atoms) is within the range of 25–150% by weight with respect to the weight of said radical copolymerizable vinyl monomer of monomer mixture, and (b) the elastomeric ethylene-vinyl acetate copolymer to which the $CH_2=C(CH_3)COO-$ group or $CH_2=CHCOO-$ group so introduced as a part of the side chain (rubber component). As a method of polymerization, bulk polymerization, suspension polymerization, solution polymerization or a combination thereof may be conveniently adopted.

It is preferred to dissolve the rubber component in the monomer mixture and, while stirring the resulting mixture, to carry out a preliminary partial bulk polymerization, at least until phase inversion takes place; the rubber component becomes a dispersed phase and the resin component formed by polymerization of the monomer or monomer mixture becomes the continuous phase. Subsequently, after the phase inversion takes place, it is preferred to carry out the suspension polymerization procedure or bulk polymerization procedure substantially without stirring.

The temperature of polymerization is 40–250° C., preferably 60–200° C.

A polymerization initiator desirably used in the polymerization reaction is an oil-soluble radical polymerization initiator, for example, an azo compound such as azobisisobutyl nitrile and azobiscyclohexanenitrile and a peroxide, hydroxycyclohexyl peroxide and benzoyl peroxide, for example.

In case the vinyl monomer mixture, like mixtures containing styrene, can be thermally polymerized without an initiator, it is industrially practicable to carry out thermal polymerization at a polymerization temperature of above 80° C. without using the polymerization initiator.

With respect to the composition of the monomer which is used to form resin (A), it is preferable not to allow the total of the aromatic vinyl compound, methacrylic acid alkyl ester and acrylonitrile to become less than 70% by weight; the impact strength and other mechanical properties of the resin (A) per se are reduced and because these properties of the resin composition of the present invention after mixing the resin (A) with ABS resin are also reduced. And even though this 70% condition is satisfied, the total of 3.5 times the percentage by weight of acrylonitrile plus the percentage by weight of methacrylic acid alkyl ester should be within the range of 25–150% by weight of the monomer or monomer mixture; otherwise the impact strength of the resin (A) and of the resin composition of the present invention become too low. These formulae have been discovered by conducting a great number of experiments.

The content of the rubber component in the resin (A) in accordance with the present invention should not be so large as to cause a phase separation to take place but should not be so small as to interfere with the attainment of excellent properties when mixed with ABS resin. Accordingly it is preferable that the amount of the rubber component used is such that 2–60% by weight is contained in the resin (A), preferably more than 5% by weight.

In carrying out the suspension polymerization reaction, it is possible to use as a suspension stabilizer a water-soluble high molecular weight compound such as polyvinyl alcohol, styrene-maleic acid copolymer, sodium polymethacrylate and methyl methacrylate-acrylamide copolymer and an inorganic compound which is substantially insoluble in water, such as carbonate, sulfate, phosphate and hydroxide.

In carrying out the radical polymerization, in order to control the molecular weight of the polymer it is desirable to use mercaptans such as n-dodecyl mercaptan and tert-dodecyl mercaptan and a generally known chain transfer agent such as $\alpha$-thiopropionic acid, $\beta$-thiopropionic acid, thioglycol and $\alpha$-methyl styrene dimer, as the occasion demands.

The expression "ABS resin" as used in connection with the present invention means all of the known so-called ABS resins and these modifiers more specifically, ABS resin in the present invention consists essentially of (iii) more than about 4% by weight, preferably less than 70% by weight, more preferably 10–60% by weight polybutadiene series rubber, and (iv) about less than 96% by weight, preferably more than 30% by weight, more preferably 90–40% by weight polymer obtained by polymerizing said monomer or monomer mixture (a).

Originally, it is called ABS resin because its components consist of acrylonitrile, butadiene and styrene. However, in the present invention the expression "ABS resin" has not only its original meaning but also is intended to include is modifiers as above mentioned.

The polybutadiene series rubber means essentially homo-polybutadiene and copolymers of more than 60% by weight butadiene and up to 40% by weight vinyl monomer selected from the group consisting of styrene, acrylonitrile, methyl methacrylate and mixtures thereof. The rubber modified by copolymerizing with a small quantity of other vinyl monomer such as methyl acrylate, butyl acrylate, ethyl acrylate, butyl methacrylate, vinyl acetate and divinyl benzene may be used as polybutadiene series rubber.

The principal methods of preparing ABS can be roughly divided into the blend method and the graft method. The blend method is the method of blending polybutadiene series rubber with the resin obtained by polymerizing said monomer or monomer mixture. The graft method is the method of polymerizing said monomer or monomer mixture in the presence of polybutadiene series rubber using a graft polymerization initiator such as an organic peroxide. The graft type ABS resin thus obtained may be used by blending with the resin obtained by polymerizing said monomer or monomer mixture (a) in some cases. In the present invention, ABS resin may be prepared by any of these methods but "graft" type ABS resin and "graft blend" type ABS resin are preferred.

In the present invention, any ABS resin commercially available is satisfactory. In many cases it is prepared by grafting styrene and acrylonitrile to a rubber latex of the butadiene series by emulsion polymerization. Also satisfactory is heat resistant ABS resin, wherein a part or all of the styrene is replaced by $\alpha$-methyl styrene in order to improve heat resistance, and transparent ABS resin wherein part or all of the styrene and acrylonitrile is replaced by methyl methacrylate.

It is also known that ABS resin may be prepared by dissolving rubber of the butadiene series in a monomer mixture consisting of styrene added with acrylonitrile and/or methyl methacrylate, and graft polymerizing the resultant mixture by bulk polymerization or a combination of bulk polymerization with suspension polymerization.

The content of rubber of the polybutadiene series in graft type or blend type ABS resin is at least 4% by weight of the ABS resins, because this is needed for obtaining high impact strength resins. There is no critical limitation as to the upper limit of rubber content in these ABS resins. However, with graft type ABS, in order to cause sufficient graft polymerization, a content of less than 70% by weight of the weight of the rubber of polybutadiene series is preferable, and also with blend type ABS resin, a rubber content of less than 70% by weight is preferred. Specifically, the ABS resins having a rubber content of 10–60% by weight are more generally used. However, it is highly preferred in this invention to employ graft type ABS resin.

As to the composition of the vinyl monomer to be grafted, for example, in case a mixture of styrene with acrylonitrile is used, a mixture containing 10–40% by weight of acrylonitrile is preferable. However, in case methyl methacrylate is contained in the monomer mixture to be graft, acrylonitrile need not necessarily be provided.

Typical suitable ABS resins are described in U.S. Patents Nos. 2,908,661, 3,010,936, 3,073,798 and 3,267,178 and British Patents Nos. 994,924, 842,405 and 851,491.

Especially preferable is an ABS resin obtained by a graft method. This is obtained by polymerizing a vinyl monomer in the presence of rubber of the butadiene series or prepared by a graft-blend method, namely, blending a resin obtained by polymerizing a vinyl monomer in the presence of rubber of the butadiene series with a resin obtained by separately polymerizing the vinyl monomer only. Such graft blended ABS resins have a composition of 18–90% by weight of styrene and/or $\alpha$-methyl styrene, 0–36% by weight of acrylonitrile, 0–85% by weight of methyl methacrylate and 10–60% by weight of rubber of the butadiene series. As heretofore stated, the total of 3.5 times the percentage by weight of acrylonitrile plus the percentage by weight of methyl methacrylate should be 25–150% of the weight of the monomer or monomer mixture used for preparing this ABS resin. Also, transparent ABS resin and heat resistant ABS resin are highly preferred.

In the thermoplastic resin composition of the present invention, the mix ratio of resin (A) to ABS resin may vary depending upon the contents of the rubber components in the respective resins. However, it is necessary to so determine the proportions so that the rubber content of the ethylene-vinyl acetate copolymer initially having in its side chain a $CH_2=C(CH_3)COO-$ group or $$CH_2=CHCOO-$$

(hereinafter referred to as rubber component—1) and of rubber of the butadiene series (hereinafter referred to as rubber component—2) in the resin composition after mixing will be at least 1% by weight, preferably 2% by weight.

Especially, the mix ratio of resin (A) to ABS resin should be so determined that the ratio of rubber component—2 to the total rubber contained in the mixed composition of resin (A) with ABS resin falls within the range of 2–70% by weight, preferably 5–65% by weight.

When the aforementioned ratio is within this range, the weatherability of the resin mixture, tested by impact resistance, is far superior to that of the ABS resin used. Moreover, a surprising result is observed in that the weatherability of the mixture is equal to or greater than that of the resin (A) that was used.

Resin (A) may be mixed with ABS resin in any manner provided the mixing is uniform. Mixing may be carried out using known mixers such as a Banbury mixer, a co-kneader, or a single or multiple screw extruder.

With the resin composition of the present invention, generally known antioxidants, photostabilizers, plasticizers, antistatic agents, pigments, glass fibers and fillers may be blended.

It is possible to mold the resin composition of the present invention by using molding methods normally applied to ordinary thermoplastic resins, such as injection molding, extrusion molding, vacuum molding, hollow molding and compression molding.

High impact polystyrene and ABS resins that are representative of the high impact resins heretofore commercially available have used as their rubber components rubber of the butadiene series only. Due to the presence of an unsaturated bond in the main chain of these rubbers, they are extremely inferior in weatherability and ozone resistance, being hardly tolerable for actual outdoor use. On the contrary, the resin composition of the present invention adds to the excellent properties of ABS resin weatherability which is an excellent property not possessed by ABS resin, and can be broadly used in applications requiring both excellent impact resistance and excellent weatherability, and are especially suited for outdoor use.

Example 1

(I) A representative method of preparing resin (A) was carried into effect as follows:

A reactor vessel, equipped with a stirrer, was charged with 66 parts by weight of styrene, 14 parts by weight of methyl methacrylate and 20 parts by weight of an ethylene-vinyl acetate copolymer (vinyl acetate content 14%, "Evaflex" #560, manufactured by Mitsui Polychemical Co., Ltd.). The reaction system was sealed and stirred at 75° C. for about 1 hour to prepare a uniform solution. About 0.6 part by weight of a methanol solution (1.5 N) of sodium methoxide was added to the solution and the two were reacted with stirring for one hour to obtain a styrene-methyl methacrylate mixed solution containing 20% of a graft activated ethylene-vinyl acetate copolymer having in its side chain 0.154 mmole/g. of methacrylic acid residual group.

A reactor vessel, equipped with a stirrer and a cooling pipe was charged with 65 parts of the material thus produced in the foregoing operations. There were added 16 parts of styrene, 19 parts of acrylonitrile and 0.1 part of t-dodecyl mercaptan and the temperature inside the reaction system was maintained at 73° C. with stirring. 0.01 part of azobisisobutylonitrile was added and the resulting mix was bulk polymerized for about 45 hours, after which the polymerization system was cooled. A partial polymer whose content of all polymers was 24.8% was obtained.

A reaction pipe was charged with 50 parts by weight of a solution obtained by dissolving 0.35 part by weight of azobisisobutylonitrile in the aforesaid partial polymer, 100 parts by weight of pure water, 0.03 part by weight of a methyl methacrylate-acrylamide copolymer (acrylamide content 30%) and 0.06 part by weight of sodium primary phosphate were added and, while stirring the content, polymerization was carried out according to the following temperature schedule.

(a) The temperature inside the system was elevated from 50° C. to 70° C. in 45 minutes.

(b) Further, said temperature was elevated from 70° C. to 80° C. in 45 minutes.

(c) Further, said temperature was elevated from 80° C. to 110° C. in 30 minutes.

(d) Further, the temperature was kept at 110° C. for 30 minutes, and 2 hours afterward, the system was slightly vented to distil out the unreacted monomer. The system was then cooled and the resulting polymer was removed, washed with water and dried. Beads of resin (A), of the following composition, were thus obtained.

| | Percent by weight |
|---|---|
| Styrene | 59 |
| Methyl methacrylate | 9 |
| Acrylonitrile | 19 |
| Ethylene-vinyl acetate copolymer | 13 |

The above identified composition relates, of course, to components initially used and later polymerized.

(II) Preparation of ABS resin:

To 75 parts by weight of polybutadiene latex (solid component 60%, average particle size 0.27μ, gel content 85%), 150 parts by weight of water, 0.3 part by weight of sodium formaldehyde sulfoxylate, 0.01 part by weight of ferrous sulfate, 0.1 part by weight of ethylene diamine sodium tetraacetate, 2 parts by weight of sodium laurate and 0.1 part by weight of sodium phosphate were added and the resulting mixture was heated to 65° C. in a nitrogen atmosphere. Next, to said mixture, a mixture of 41 parts by weight of styrene, 14 parts by weight of acrylonitrile and 0.5 part by weight of n-dodecyl mercaptan and another mixture of 0.2 part by weight of cumene hydroxy peroxide, 0.5 part by weight of sodium laurate and 20 parts by weight of water were added dropwise continuously with stirring in 6 hours, to polymerize said mixture. After completion of the dropping, while the polymerization temperature was being kept at 65° C., stirring was continued for another 2 hours. The latex thus obtained was coagulated by adding an acid. After filtering, the coagulated latex was neutralized by adding an alkali, washed with water to remove the emulsifier. Further, by filtering and drying, a powder of ABS resin consisting of 41% of styrene, 14% of acrylonitrile and 45% of polybutadiene was obtained.

(III) Blending of resin (A) with ABS resin:

Two samples of pellets were prepared; they were designated (A)/ABS–1 and (A)/ABS–2, respectively. The relative amounts of resin (A) and ABS resin were determined so that the content of polybutadiene in the entire mixture would become 5% by weight for one sample and 10% by weight for the other sample. To each of these samples 0.3 part of lauryl t-butyl phenyl phenylphosphite was added. After each resulting mixture was pre-mixed by means of a "Henschel" mixer, it was kneaded in an extruder the temperature of whose cylinder was set at 200° C. and pelletized.

On the other hand, for the purpose of comparison, said ABS resin was blended with AS resin ("Tyryl" 767, manufactured by Asahi Dow Co., Ltd., a styrene-acrylonitrile copolymer, the styrene content being about 70% by weight) so that the content of polybutadiene in the two samples prepared, was 10% by weight and 18% by weight using procedures exactly the same as the foregoing. The two samples of pellets so obtained were designated ABS–1′ and ABS–2′, respectively.

(IV) Method of testing weatherability:

Using tensile test pieces (each 3 mm. thick obtained by injection molding of the resin being tested at a cylinder temperature of 230° C. and a mold temperature of 40–50° C., Izod test pieces (each 12.7 x 12.7 x 63.5 mm.) and square plates (each 3 mm. thick) obtained by compression shaping at 175–180° C., the weatherability tests were carried out according to the following methods.

Tensile test pieces.—These pieces were exposed outdoors at an angle of 45° in the southern part of Ohtsu City, Japan for one year (from July 1, 1968 through July 1, 1969) and at a tensile speed of 0.5 cm./min., changes of the tensile properties were compared.

Izod impact test pieces.—These pieces were exposed to rays from a Sunshine weather-o-meter (manufactured by Toyo Rika Co., Ltd., WE-SUN-HC type) with the fronts and the backs of the pieces being turned over every 20 hours. After carrying out the irradiation for the predetermined period of time, V notches were provided at positions corresponding to the side surfaces of the irradiated surfaces and the notched Izod impact strengths were determined according to ASTM Specification D 256-56.

Compression shaped square plates.—After exposing to rays from a Sunshine weather-o-meter these plates were cut into test pieces 8 mm. wide and 15 mm. long square by means of a cutting machine, the cut surfaces were carefully finished by means of paper files, and thereafter the irradiated surfaces were struck with a hammer using a Dinestadt impact tester (manufactured by Toyo Seiki Co., Ltd.) to determine impact values. (The distance between impacts was 5.5 mm.)

(V) Results of the weatherability tests:

(1) Changes of tensile properties.—The comparative results of resin (A)/ABS-1, resin (A)/ABS-2, resin (A) alone, ABS-1', ABS-2' and AS resin are shown in Table 1.

becoming brittle, but also in terms of change of tensile strength.

BRIEF DESCRIPTION OF THE DRAWINGS

(2) Change of Izod impact strengths.—In FIG. 1 of the drawings the comparative results are shown. The following results show the time of irradiation of a ray from a weather-o-meter that is required until the impact strengths are reduced by 10%.

| | Hr. |
|---|---|
| Resin (A)/ABS-1 | 400 |
| Resin (A)/ABS-2 | 400 |
| Resin (A) alone | 230 |
| ABS-1' | 100 |
| ABS-2' | 50 |
| AS resin | 330 |

Considering weatherability as compared by this method, the resin composition of the present invention is superior not only to ABS resin, but also to resin (A).

Figure 1:
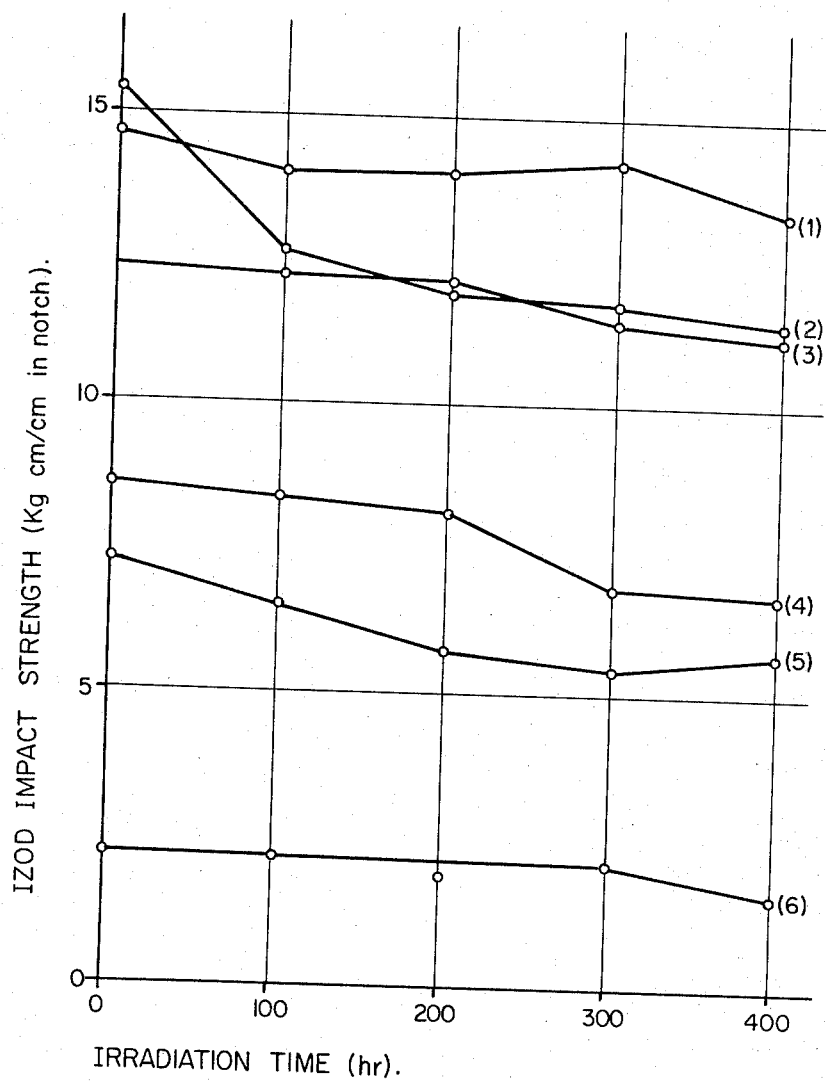
FIG. 1 of the drawings shows changes of Izod impact strengths of each resin corresponding to times for irradiation by a weather-o-meter, wherein curve (1) shows the resin (A)/ABS-2 of the present invention, curve (2) shows ABS-2', curve (3) shows the resin (A)/ABS-1 of the present invention, curve (4) shows resin (A) alone, curve (5) shows ABS-1' and curve (6) shows AS resin.
Figure 2:
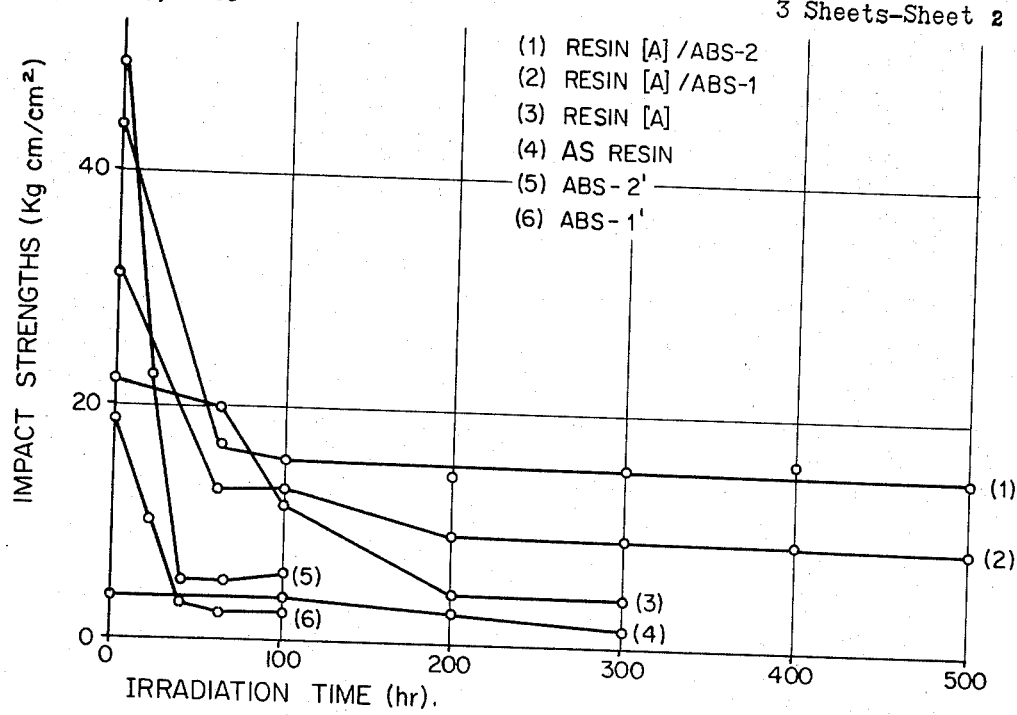

(3) Change of Dinestadt impact strengths.—In FIG. 2 of the drawings, the comparative results are shown. In change of impact resistance by irradiation of a ray by a weather-o-meter for up to 100 hours, the resin composition of the present invention is inferior in weatherability to resin (A); however, the impact value of the resin composition of the present invention by irradiation by a weather-o-meter for 200 hours and beyond is considerably larger than that of resin (A). The impact value of high impact polystyrene ("Styron" 475) before degradation, measured by this method, is 11 kg./cm./cm.[2]. Thus, it is

TABLE 1.—WEATHERABILITY OF RESINS (TENSILE PROPERTIES)

| Exposure period (months) | Tensile properties | Resin (A)/ABS-1 | Resin (A)/ABS-2 | Resin (A) | ABS-1' | ABS-2' | AS resin |
|---|---|---|---|---|---|---|---|
| 0 | Strength at yield [1] | 420 | 390 | 440 | 490 | 460 | |
| | Strength at break [2] | 380 | 370 | 410 | 400 | 390 | 710 |
| | Elongation at break [3] | 75 | 100 | 87 | 21 | 25 | 2 |
| 1 | Strength at yield | 420 | 390 | 445 | 500 | 3/5 | |
| | Strength at break | 385 | 360 | 400 | 480 | 430 | |
| | Elongation at break | 83 | 71 | 92 | 4 | 2 | |
| 2 | Strength at yield | 430 | 390 | 450 | | | |
| | Strength at break | 390 | 360 | 420 | 450 | 300 | |
| | Elongation at break | 56 | 47 | 91 | 2 | 2 | |
| 3 | Strength at yield | 420 | 390 | 450 | | | |
| | Strength at break | 380 | 360 | 390 | 370 | 270 | 740 |
| | Elongation at break | 67 | 53 | 67 | 2 | 3 | 2 |
| 6 | Strength at yield | 460 | 400 | 470 | | | |
| | Strength at break | 390 | 340 | 420 | 290 | 190 | 730 |
| | Elongation at break | 28 3/5 | 21 1/5 | 52 | 1 | 1 | 2 |
| 9 | Strength at yield | 440 | 400 | 470 | | | |
| | Strength at break | 420 | 340 | 420 | | | 680 |
| | Elongation at break | 4 | 3 | 8 | | | 2 |
| 12 | Strength at yield | | | | | | |
| | Strength at break | 290 | 310 | 230 | | | 240 |
| | Elongation at break | 2 | 2 | 2 | | | 2 |

[1] Kg./cm.[2]. [2] Kg./cm.[2]. [3] Percent.

NOTE.—The superscript "3/5" as applied to numerical values for yield strength shows that of five test pieces, only three showed yield strengths and the remaining two became so brittle as to prevent numerical determination.

As will be seen from Table 1, the resin composition of the present invention is manufactured from a blend of resin (A) with ABS resin, in spite of the fact that, when viewed from a time for becoming brittle, it is almost the same as resin (A), and as compared with ABS-1' and ABS-2', it is superior by at least 5–6 times. In respect of tensile strength after a period of 12 months, the resin composition of the present invention is by far superior to resin (A). When the change of tensile strengths is observed, in spite of the fact that resin (A) and AS resin have roughly the same properties of weatherability, the resin composition of the present invention obtained by blending with ABS resin is superior in weatherability to ABS-1' and ABS-2' not only in terms of time for significant to determine, for other materials, how long they can resist the effects of the same rays. Such tests were conducted and their results are shown in Table 2. The resin composition of the present invention, viewed in this way, is clearly superior in weatherability to resin (A) and ABS resin.

TABLE 2

| Sample name: | Hr.[1] |
|---|---|
| Resin (A)/ABS-2 | 500 |
| Resin (A)/ABS-1 | 180 |
| Resin (A) | 130 |
| ABS-1' | 35 |
| ABS-2' | 20 |

[1] Time of irradiation of weather-o-meter rays required to reach an impact value equal to but not greater than 11 kg. cm./cm.[2]

ABS-1' and ABS-2' use essentially the same ABS resin composition of the present invention and are obtained by blending ABS resin with AS resin whose change of impact resistance value is superior to that of resin (A), yet they are remarkably inferior in weatherability to the resin composition of the present invention.

EXAMPLE 2

Using 29 parts by weight of ABS resin obtained in (II) of Example 1, 71 parts by weight of AS resin ("Tyril" 767, manufactured by Asahi Dow Co., Ltd., a styrene-acrylonitrile copolymer, styrene content about 70% by weight) were mixed to prepare ABS resin. In this ABS-AS resin, the rubber content is about 13% by weight. The so-prepared ABS resin was mixed with resin (A) in a predetermined ratio and the two were blended by the method disclosed in Example 1. The content of all the rubber component in the mixed composition was caused to become a constant value of 13% by weight and the mixing ratio of polybutadiene and ethylene-vinyl acetate copolymer was varied. The resulting resin was called resin (A)/ABS.

For the purpose of comparison ABS resin obtained in (II) of Example 1 was mixed with AS resin ("Tyril" 767) so that the content of the rubber component after mixing would become 13% by weight (which was called ABS') and ABS resin prepared in (II) of Example 1 was mixed with acrylic resin (polymethylmethacrylate) so that the content of the rubber component after mixing would similarly become 13% by weight (this was called ABSM). These were blended by the same method as that mentioned above. Changes of the notched Izod impact strengths of Example 1 were employed as a method of estimating the weatherability.

Figure 3:
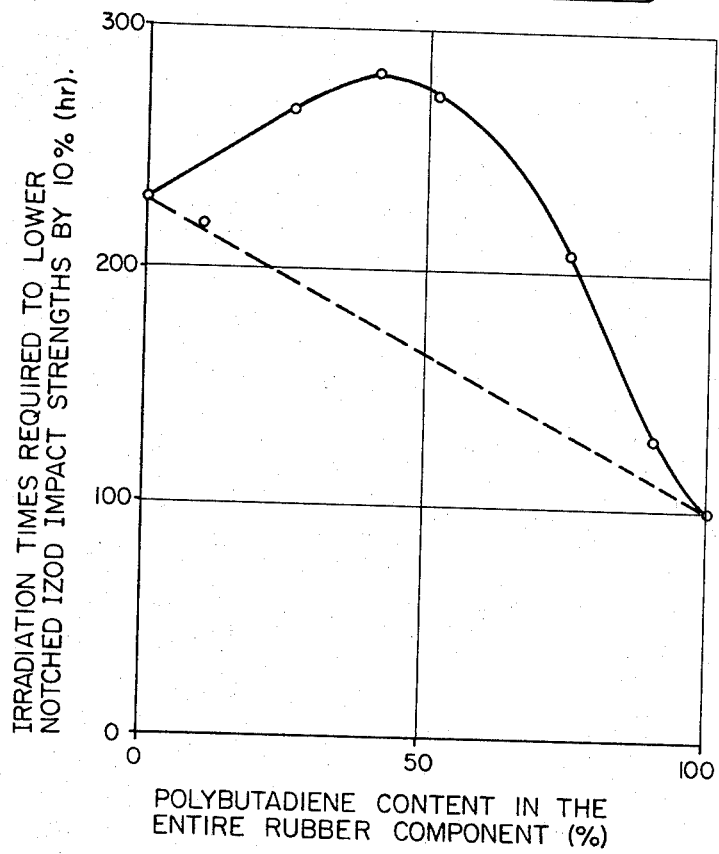

Using samples of blended compositions of resin (A) with ABS resin, wherein the mixing ratio of an ethylene-vinyl acetate copolymer and polybutadiene was varied variously, the irradiation times required to reduce the notched Izod impact strengths by 10% were measured. The results are shown in FIG. 3 of the drawings. The weatherability of the resin composition of the present invention was not only superior to the case in which the additive properties in accordance with the mixing ratio of the two rubber components were established (shown by dotted lines in FIG. 3), but also, depending upon the blending composition, a surprising phenomenon was observed that its weatherability was superior to that of resin (A).

Figure 4:
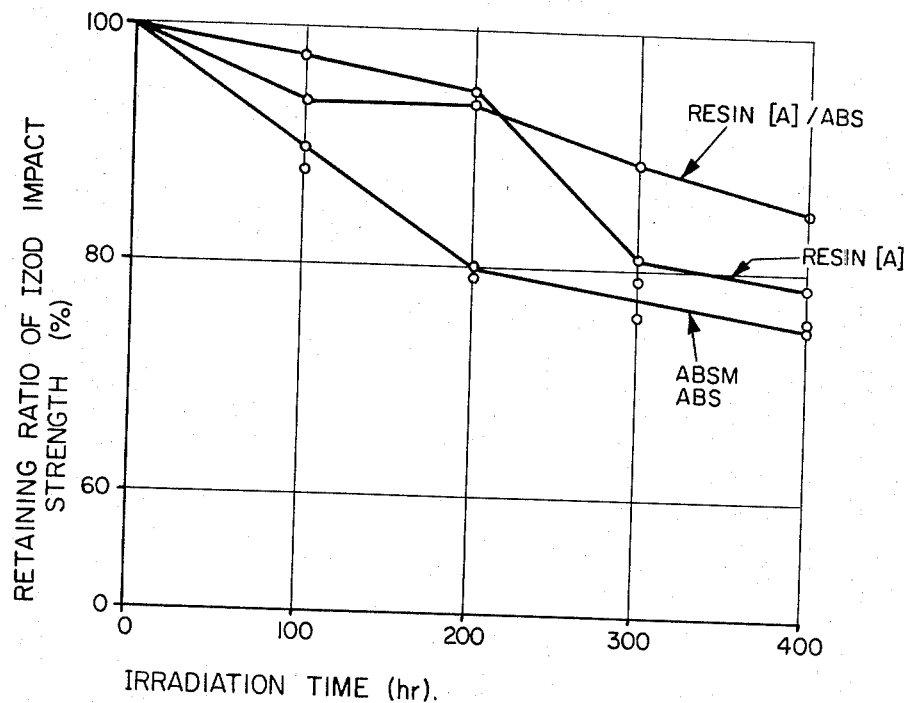

In FIG. 4 of the drawings, changes of notched Izod impact strengths by irradiation of resin (A), resin (A)/ ABS (in this case the content of polybutadiene in the entire rubber component was 50%), ABS' and ABSM were shown. (The Izod impact strengths of these resins were 8.2–8.7 kg. cm./cm.$^2$ and there were substantially no differences.)

As would be apparent from FIG. 4, even when ABS resin was blended with acrylic resin having good weatherability, the weatherability of the blend was hardly different from that of ABS resin, and it was recognized that as compared with the resin composition of the present invention, the blend was considerably inferior in weatherability.

Example 3

(I) Method of preparing resin (A): The resin (A) obtained in Example 1 was used.

(II) ABS resin: A commercially available ABS resin (consisting of 64% by weight of styrene, 20% by weight of acrylonitrile and 16% by weight of polybutadiene) was used.

(III) Blend of resin (A) with ABS resin: Beads of resin (A) and pellets of ABS resin were weighed so that the two would assume a 50:50 weight ratio. To the total mix of the two resins 0.15 part of lauryl t-butyl phenyl, phenylphosphite was added, the mixture was pre-mixed by a Henschel mixer and pelletized after being kneaded in an extruder the temperature of whose cylinder was controlled at 180° C. For the purpose of comparison of weatherability, the pellets of ABS resin per se were offered for molding.

(IV) Method of measuring weatherability: As in Example 1, changes of Dinestadt impact strengths of the thermoplastic resin composition of the present invention and ABS resin by irradiation of a ray from a weather-o-meter were checked.

Figure 5:
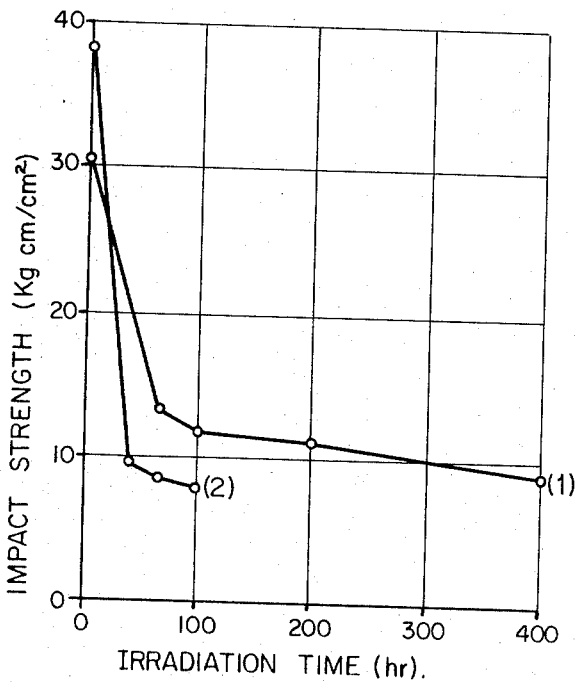

(V) Test results: The results are shown in FIG. 5 of the drawings, wherein curve (1) shows the composition of the present invention, while curve (2) shows ABS resin. As is apparent from FIG. 5, the time for irradiation using a ray from a weather-o-meter, until the Dinestadt impact strength was reduced to 8 kg. cm./cm.$^2$, was 100 hours in the case of ABS resin, whereas the time in the case of the composition of the present invention was 400 hours. It was recognized that the composition of the present invention was far superior in weatherability to ABS resin.

Example 4

(I) Method of preparing resin (A) (i): A reaction vessel was charged with 15 parts by weight of a polymer obtained by recovering by precipitation with methanol of an activated ethylene-vinyl acetate copolymer having in its side chain a $CH_2=C(CH_3)COO-$ group. Also added were 65 parts by weight of styrene and 20 parts by weight of acrylonitrile and the contents were dissolved at 75° C. The internal temperature was lowered to 70° C. and 0.35 part by weight of acrylonitrile and 0.1 part of tert-dodecyl mercaptan were added to the contents and dissolved therein. Promptly thereafter, 200 parts by weight of pure water, 0.06 part of a methacrylic acid-acrylamide copolymer and 0.12 part by weight of sodium primary phosphate were charged in said reaction vessel, and while stirring the resultant reaction system, it was suspension polymerized by the following temperature schedule:

70° C. for 2 hours, the temperature was elevated from 70° C. to 110° C. in 45 minutes, the temperature of 110° C. was kept for 30 minutes and then the system was slightly vented for 2 hours to distil out the unreacted monomer.

According to the foregoing operations, beads of resin (A) of the following composition were obtained:

| | Percent |
|---|---|
| Styrene | 65 |
| Acrylontrile | 20 |
| Ethylene-vinyl acetate copolymer | 15 |

(II) Method of preparing resin (A) (ii): The procedure was like Example 1 excepting the amount of methacrylic acid residual group in the side chain of the activated ethylene-vinyl acetate copolymer and the content of vinyl acetate in the ethylene-vinyl acetate copolymer. The content of vinyl acetate in the ethylene-vinyl acetate copolymer ("Evaflex" #560, manufactured by Mitsui Polychemical Co., Ltd.) was 13% and the amount of the methacrylic acid residual group in the side chain was 0.371 mmole/g.

This resin was called resin (A)–2.

(III) ABS resin: A commercially available ABS resin (consisting of 21% by weight of styrene, 23% by weight of acrylonitrile and 56% by weight of polybutadiene) was used.

(IV) Blend of resin (A)–1 or resin (A)–2 with ABS resin: As in Example 3, resin (A)–1 or resin (A)–2 was so blended with ABS resin that the weight ratio would become 1:1 to obtain blended compositions. These compositions were designated as resin (A)–1/ABS and resin (A)–2/ABS, respectively.

(V) Test method: Same as in Example 1, the notched Izod impact strengths after irradiation by means of a weather-o-meter for 200 hours were measured.

(VI) Test results: The results are shown in Table 3.

TABLE 3

| Sample | Izod impact strength | | Retaining ratio of the impact strength,[1] (percent) |
|---|---|---|---|
| | Blank | After irradiation for 200 hours | |
| Resin (A)-1/ABS | 16.7 | 15.3 | 91 |
| Resin (A)-2/ABS | 15.3 | 14.1 | 92 |
| ABS resin | 22.1 | 16.8 | 74 |

[1] After irradiation for 200 hours.

The thermoplastic resin compositions of the present invention, as compared with ABS resin which was used as a basis therefor, had a small decrease of the Izod impact strength after irradiation and could be said to be considerably superior in weatherability.

The following is claimed:
1. A thermoplastic resin composition consisting of:
   (I) high impact-resistance resin (A) produced by copolymerizing about 98–40% by weight of a vinyl monomer or monomer mixture (a) consisting of at least 70% by weight of a monomer selected from the group consisting of vinyl aromatic, methacrylic acid alkyl ester wherein the alkyl group consists of from 1–3 carbon atoms, and acrylonitrile, wherein, the sum of 3.5 times the percent by weight of acrylonitrile plus the percent by weight of said methacrylic acid alkyl ester is within the range of 25–150% by weight of the monomer or monomer mixture, in presence of from 2–60% by weight rubbery copolymer of ethylene and vinyl acetate, (b) wherein the ethylene content is from 60–95% by weight and the vinyl acetate content is from 5–40% by weight and graft activated by introducing in its side chain $CH_2=CHCOO-$ or $CH_2=C(CH_3)COO-$ group at a ratio of 0.02 to 1.0 mmole/g. of said copolymer, and
   (II) a high impact resin consisting of 96 to 30% by weight matrix resin phase which consists essentially of a copolymer of said monomer or monomer mixture (a) and 4 to 70% by weight discrete rubber phase which consists essentially of a homopolymer or copolymer of butadiene containing more than 60% by weight of butadiene and up to 40% by weight of at least one vinyl monomer selected from the group consisting of styrene, acrylonitrile, and methyl methacrylate, the weight ratio of component (I) to component (II) being such that the weight of butadiene series rubber is in the range of about 5–65% of the total weight of butadiene series rubber plus ethylene-vinyl acetate copolymer.

2. The composition defined in claim 1 wherein the polybutadiene type resin (II) is selected from the group consisting of (i) polybutadiene-methyl methacrylate, (ii) polybutadiene-methyl methacrylate-acrylonitrile, (iii) polybutadiene-methyl methacrylate-acrylonitrile-vinyl aromatic, (iv) polybutadiene-acrylonitrile-styrene, and (v) polybutadiene-methyl methacrylate styrene.

3. The composition of claim 1 wherein said vinyl aromatic compound is styrene.

4. The composition of claim 1 wherein said methacrylic acid alkyl ester is methyl methacrylate.

5. The composition of claim 1 wherein said component II of 96.30 parts by weight of a hard resin phase consisting of 90–60% by weight of sytrene and 10–40% by weight of acrylonitrile, and 4–70 parts by weight of rubber of the butadiene series.

6. The composition of claim 1 wherein said component II consists of 96–30 parts by weight of a hard resin phase consisting of 25–100% by weight of methyl methacrylate and 75–0% by weight of styrene.

References Cited

UNITED STATES PATENTS

| 3,461,188 | 8/1969 | Baer | 260—878 |
| 3,162,696 | 12/1964 | Zimmerman et al. | 260—878 |
| 3,074,906 | 1/1963 | Calvert | 260—876 X |
| 3,314,904 | 4/1967 | Burkus | 260—876 R X |

MURRAY TILLMAN, Primary Examiner

H. W. ROBERTS, Assistant Examiner

U.S. Cl. X.R.

260—878 R